United States Patent [19]

Moss

[11] Patent Number: 4,758,856
[45] Date of Patent: Jul. 19, 1988

[54] PHOTOGRAPHIC LIGHTING APPARATUS

[75] Inventor: Peter E. Moss, Bromsgrove, England

[73] Assignee: Ellis Moss Patents Limited, Halesowen, England

[21] Appl. No.: 119,074

[22] Filed: Nov. 10, 1987

[30] Foreign Application Priority Data

Nov. 13, 1986 [GB] United Kingdom ................ 8627201

[51] Int. Cl.$^4$ .............................................. G03B 15/00
[52] U.S. Cl. ..................................... 354/292; 354/126
[58] Field of Search .......................... 354/80, 126, 292

[56] References Cited

U.S. PATENT DOCUMENTS 4,150,893  4/1979  Ueno et al. ...................... 354/80 X Primary Examiner—Michael L. Gellner
Attorney, Agent, or Firm—Young & Thompson

[57] ABSTRACT

A photographic light table comprises a top panel against which a subject is to be photographed while the panel is illuminated from below. A frame supports the panel by its edges so that the panel is maintained substantially horizontal. Light producing equipment is disposed in a chamber within the frame for illuminating the panel from below, and an arrangement is provided for removably mounting at least one light-modifying screen within the frame at a position such that the light transmitted by the light producing equipment passes through the or each screen before passing through the top panel.

10 Claims, 1 Drawing Sheet

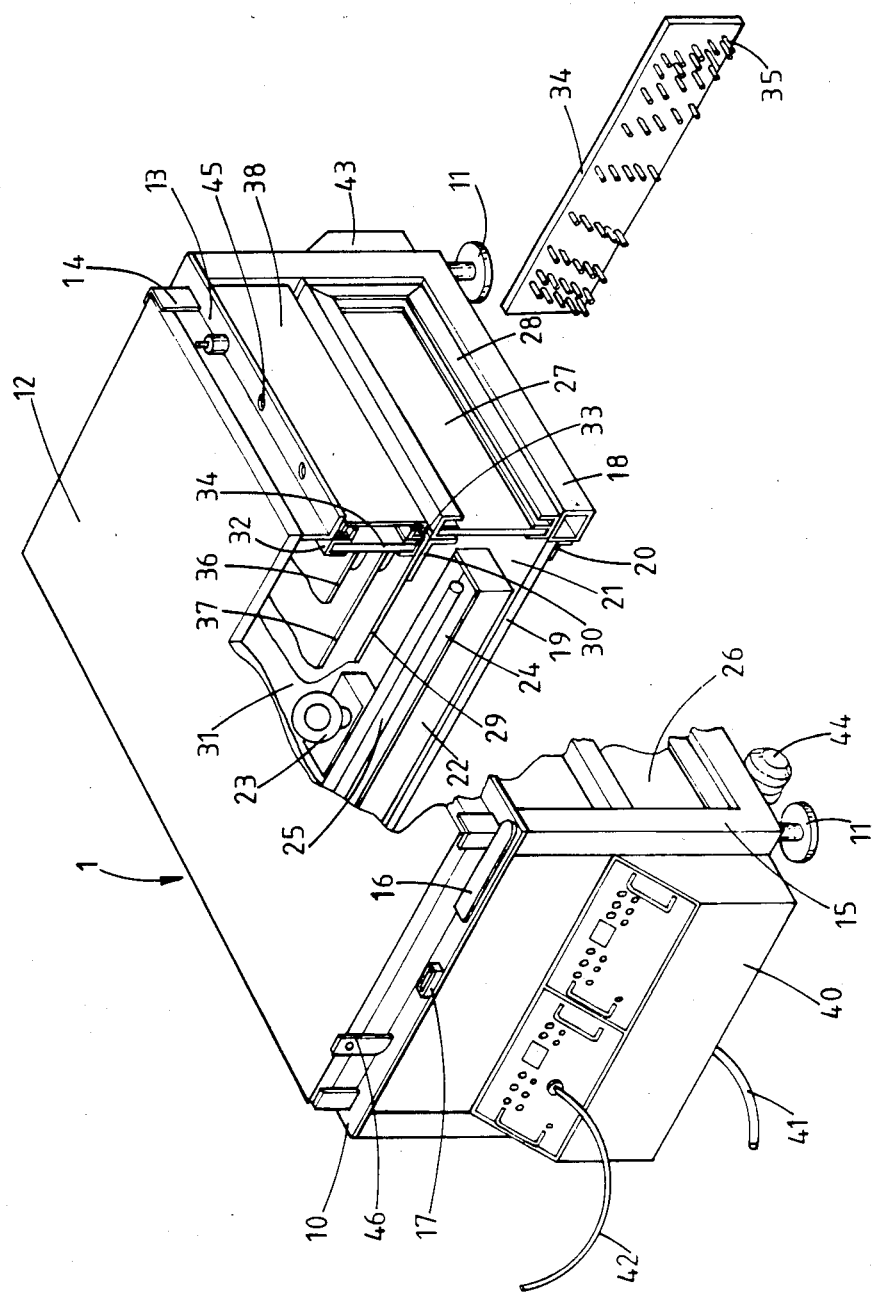

PHOTOGRAPHIC LIGHTING APPARATUS

BACKGROUND OF THE INVENTION

This invention relates to photographic lighting apparatus.

It is common practice, particularly in studio photography, to light a subject from various directions, such as from the front, back or sides, or from combinations of these, and special visual effects can be produced by using coloured or patterned lighting on a screen behind the subject so that the subject appears against such a background. It is well known to set up such lighting effects using normal tungsten or other lamps, in order that a simulation of the final effect is given, and to then carry out the actual photography using flash.

In order to set up the simulation and final flash effects, lamps are mounted on stands and are adjusted as required. Each individual photograph or group of photographs generally requires a separate assembly of lamps, screens and other equipment to produce the particular effect.

An alternative way of producing varied effects is to use double exposure techniques in which the subject is photographed against a neutral background, and a further photograph is then taken on the same negative using a coloured or illuminated screen or some other effect, so that, when the photograph is printed, the subject appears to be against the chosen background. Many different visual effects can be produced using this or other similar techniques, but the techniques used are time consuming and complex, and can be expensive in terms of the film quantity used.

It is the object of the invention to provide photographic lighting apparatus which allows many different effects to be produced, and which is relatively simple in construction and easy to use.

SUMMARY OF THE INVENTION

According to the present invention there is provided a photographic light table comprising a top panel against which a subject is to be photographed while the panel is illuminated from below, a frame supporting the panel by its edges so that the panel is maintained substantially horizontal, light producing equipment disposed in a chamber within the frame for illuminating the panel from below, and mounting means for removably mounting at least one light-modifying screen within the frame at a position such that the light transmitted by the light producing equipment passes through the or each screen before passing through the top panel.

Typically, modification of the light by the or each screen is by colour change or by application of pattern, texture or shape.

BRIEF DESCRIPTION OF THE DRAWING

In order that the invention may be more fully understood, a preferred embodiment of the invention will now be described, by way of example, with reference to the accompanying drawing, in which the single figure is a perspective view of the photographic light table, partially broken away along one side.

DETAILED DESCRIPTION OF THE DRAWING

The illustrated photographic light table 1 comprises an aluminium frame 10 having four adjustable feet 11 nd supporting a top panel 12 against which a subject is to be photographed. The top panel 12 is made from a sheet of transparent glass, typically of dimensions 6×4 feet and 15 mm thick, of very high optical quality which is also very strong so that relatively heavy objects may be placed on the unsupported central area of the panel 12 without causing it to bow to any significant extent. The quality of the glass is such that maxiumu light transmission takes place through it with minimum distortion. The top panel 12 is supported at its edges only by angles members 13 of the frame 10, and more particularly by support surfaces of these angle members 13 which are of narrow width, for example ¼ inch in width, in order that a clean horizon line is provided where the edge of the panel 12 is visible in a photograph.

The top panel 12 is accurately aligned with the tops of the angle members 13 by four corner brackets 14 which are screwed to the angle members 13, but which can be removed in order to enable the top panel 12 to be removed, for example for cleaning of the underside of the panel 12. In order to provide sealing between the tops of the angle members 13 and the top panel 12, a non-reflective sealing material, such as black velvet or felt, covers the tops of the angle members 13. The same material may also be used for lining the internal surfaces of the frame 10 in order to suppress optical reflections. The use of velvet or felt as the sealing material is advantageous since it enables the panel 12 to be slid sideways for ease of removal.

The frame 10 comprises four vertical box-section members 15, each of which incorporates a ratchet mechanism for adjustment of the height of the associated foot 11. A ratchet handle 16 is provided for operating the ratchet mechanism and is arranged to fold away against the frame 10 when not in use. The frame may be accurately levelled by means of the ratchet mechanisms and four spirit levels 17 mounted on the angle members 13, so as to ensure that the top panel 12 is horizontal in use.

The box-section members 15 are interconnected by the angle members 13 and by horizontal box-section members 18 to provide a structure of high strength and rigidity. A base 19 is supported from the box-section members 18 by angle brackets 20 and defines the floor of a lower chamber 21 within which light-producing equipment is disposed for illuminating the panel 12 from below. The light-producing equipment comprises five light devices resting on the base 21 and comprising three lighting strips 22 arranged parallel to one another and two spot lights 23 intermediate the lighting strips 22. Each lighting strip 22 comprises a fluorescent strip light 24 and a high intensity flash tube 25 positioned immediately above the fluorescent strip light 24. The lighting strips 22 are generally positioned to give an even spread of light over the whole of the area of the panel 12, although their relative positions may be varied to give special effects if required. Furthermore the spot lights 23 may be positioned and directed to provide pools of light as required. The required lighting effects may be simulated by lighting the fluorescent strip lights 24, prior to carrying out the actual photography using the flash tubes 25.

Access to the lower chamber 21 may be gained from either side by way of a respective pair of sliding doors 26 and 27 slidable in conventional manner within E-section support members 28 carried by the frame 10. Furthermore the top of the chamber 21 is delimited by a translucent polycarbonate panel 29 supported by angle brackets 30.

An upper chamber 31 is defined between the translucent panel 29 and the top panel 12. Along each of the four sides of the upper chamber 31 are arranged pairs of upper and lower U-section members 32 and 33 for supporting removable side panels 34 bearing support pegs 35 for supporting removable light-modifying screens, such as 36 and 37, in a manner which will be described in more detail below.

Only two side panels 34 are held within the frame by the members 32 and 33 at any time for supporting of the light-modifying screens, that is either two longer side panels 34 extending parallel to the length dimension of the table, or two shorter side panels 34 extending parallel to the width dimension of the table. Whichever pair of side panels 34 is used, the screens, such as 36 and 37, are supported along two opposite edges by a series of support pegs 35 on each panel 34. Each peg 35 comprises a rotatable roller mounted on a short shaft, and the pegs 35 on each panel 34 are arranged in a series of rows so that screens may be supported at different levels, and up to four screens may be used together. It will be appreciated that, when the table is in use, two of the side panels 34 will be out of use at any one time. One of the shorter panels 34 which is not in use at the time is shown in the drawing in order to illustrate the relative positions of the pegs 35.

Furthermore each of the four sides of the upper chamber 31 is provided with an openable door 38 which is capable of hinging downwardly to provide a narrow shelf. In order to introduce a light-modifying screen into the upper chamber 31, the appropriate door 38 is opened to allow access to one side of the chamber 31, and the appropriate pair of side panels 34 is slid into position between the members 32 and 33 if required. The leading edge of the screen is then caused to rest against the first peg 35 in the appropriate row of each of the two side panels 34. The screen is then pushed into the chamber 31, being firmly supported during advance into the chamber 1 by means of the rotatable rollers of the pegs 35.

Mounted at one end of the frame 10 is a control panel 40 connectable to a power supply by means of a cable 41. A remote control lead 42 also extends from the control panel 40 for remote actuation of the table. The control panel includes means for operating the light producing equipment, and particularly for operating the fluorescent strip lights 24 for simulating the required effect before taking a photograph. The control panel 40 also includes flash energisation means for actuating the flash tubes 25 in synchronisation with camera shutter operation. A storage bin 43 is mounted on the opposite end of the frame 10.

The frame 10 is additionally provided with wheels, such as castors 44, by means of which the table 1 may be moved after the feet 11 have been raised to a position in which they no longer contact the ground. The angle members 13 are provided with a variety of tapped holes 45 by means of which ancillary equipment, such as support stands, may be bolted to the frame 10. At least one perspex guide member, such as 46, is also provided along each edge of the top panel 12. The guide member 46 provides a guiding edge projecting above the upper surface of the top panel 12. The guiding edge may serve to engage one edge of an overlying sheet provided on top of the panel 12 for some special photographic effect. Each of the guide members 46 is capable of being pivoted through a right angle to a position in which no part of the guide member 46 projects above the upper surface of the panel 12.

It will be appreciated that a great variety of effects may be achieved by placing one or more light-modifying screens within the upper chamber 31. For example, a particular effect may be obtained by providing one screen, such as 36, having a regular matrix of lines drawn on it and by providing another screen, such as 37, which is plain, but of a particular colour. Screens of many different kinds can be used, incorporating coloured gels and/or grids and/or holes, for example, to vary colour, texture, pattern, shape or other characteristics. By placing screens having particular shapes closer or further away from the top panel 12, it is possible to produce sharp-edged or diffuse-edged pattern or shape features. It will be readily apparent to the professional photographer that a variety of special effects may be obtained by using different combinations of screens and by appropriately varying the back lighting provided by the light-producing equipment. Top lighting of the subject can also be provided using conventional light stands.

Flash may be generally defined as relating to short duration, high intensity light, being usually in the range 1/250 to 1/2000 second in duration and having a daylight colour temperature of approximately 5500° Kelvin.

I claim:

1. A photographic light table comprising a top panel against which a subject is to be photographed while the panel is illuminated from below, a frame supporting the panel by its edges so that the panel is maintained substantially horizontal, light producing equipment disposed in a chamber within the frame for illuminating the panel from below, and mounting means for removably mounting at least one light-modifying screen within the frame at a position such that the light transmitted by the light-producing equipment passes through the or each screen before passing through the top panel.

2. A photographic light table according to claim 1, wherein the light-producing equipment includes photographic flash light means.

3. A photographic light table according to claim 1, wherein the light-producing equipment includes continuous light means.

4. A photographic light table according to claim 1, wherein the mounting means is adapted to mount one or more light-modifying screens at different levels within the frame.

5. A photographic light table according to claim 1, wherein the mounting means comprises support pegs projecting inwardly from opposite side walls of the frame and positioned to support a light-modifying screen along two opposite edges.

6. A photographic light table according to claim 5, wherein the support pegs project from two side panels removably mounted opposite one another within the frame and removable from the frame by sliding.

7. A photographic light table according to claim 1, wherein the mounting means is disposed in a further chamber separated from the first-mentioned chamber by a translucent panel.

8. A photographic light table according to claim 1, wherein at least one door is provided in the side of the frame to provide access to the or each chamber from the side.

9. A photographic light table according to claim 1, having wheels for supporting the table during movement of the table.

10. A photographic light table according to claim 1, having legs which are adjustable in height.

* * * * *